G. H. MURRAY, Jr.
DYNAMO ELECTRIC MACHINE.
APPLICATION FILED NOV. 6, 1914.
1,255,457.
Patented Feb. 5, 1918.
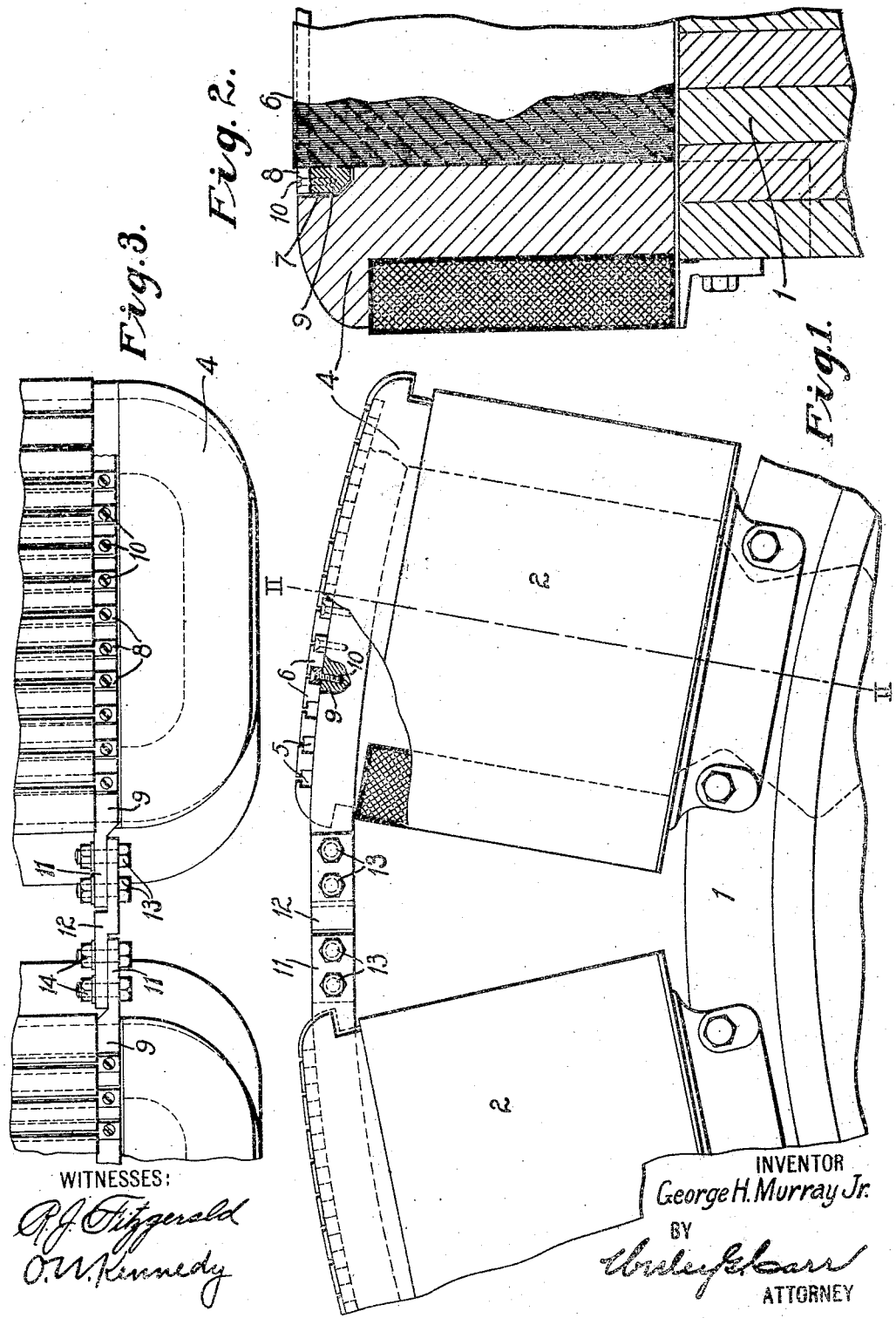
WITNESSES:
P. J. Fitzgerald
O. W. Kennedy
INVENTOR
George H. Murray Jr.
BY
ATTORNEY

UNITED STATES PATENT OFFICE.

GEORGE H. MURRAY, JR., OF WILKINSBURG, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,255,457.

Specification of Letters Patent.

Patented Feb. 5, 1918.

Application filed November 6, 1914. Serial No. 870,592.

*To all whom it may concern:*

Be it known that I, GEORGE H. MURRAY, Jr., a citizen of the United States, and a resident of Wilkinsburg, in the county of Allegheny and State of Pennsylvania, have invented a new and useful Improvement in Dynamo-Electric Machines, of which the following is a specification.

My invention relates to amortisseur windings for dynamo-electric machines, and it has for its object to provide a winding of the character specified that shall be simple and effective, and have sufficient strength to withstand severe mechanical stresses imposed thereon when placed on the rotating field members of alternating current machines of large capacity.

In the design and construction of alternating current machines of various types, it has been found desirable to provide the field magnets with short circuited windings of the squirrel-cage or grid type, in order that the currents induced therein may exercise a beneficial effect in the operation of the machine. Such windings are termed "amortisseur" or "damper" windings and are commonly used on synchronous apparatus to prevent "hunting" or to provide means for starting such apparatus by means of the torque produced by induction-motor action in the short circuited windings.

Amortisseur windings, as heretofore constructed, comprised a number of conducting bars embedded in each field magnet core and connected, at their ends, by suitable short circuiting rings. This construction, while effective for all electrical purposes, possesses a disadvantage in that the overhung portions of the embedded bars and the unsupported end rings attached thereto are liable to failure when subjected to severe mechanical stresses.

Stresses caused by centrifugal force occur in the rotating field members of certain types of synchronous apparatus of large capacity when designed to operate at momentary excessive overspeeds, such as might occur in the operation of synchronous motors used for transmission line regulation. For such machines, the ordinary open-grid type of amortisseur winding would be undesirable because of the large bending moments that would be produced by centrifugal stresses in the end rings upon the overhanging portions of the conducting bars.

By my invention, I propose to construct a completely embedded amortisseur winding that shall be supported at all points and so form a rigid structure capable of withstanding severe mechanical stresses.

In the accompanying drawings, Figure 1 is an end view, partially in section and partially in elevation, of a portion of a rotating field member of a dynamo-electric machine provided with an amortisseur winding constructed in accordance with my invention; Fig. 2 is a sectional view taken on the line II—II of Fig. 1, and Fig. 3 is a fragmentary plan view of the parts shown in Fig. 1.

A field magnet yoke 1 carries magnet pole pieces 2 which are built up of laminations 3 and end plates 4 bolted and dove-tailed to the yoke 1, in the usual manner. Partially closed slots 5, extending through the core laminations 3, contain brass or copper bars 6 which extend beyond the ends of the slots 5 at both ends. The end plates 4 are provided with grooves 7 that are adapted to receive the projecting portions 8 of the bars 6. The grooves 7 are cut to conform to the curvature of the core laminations 3 and are of sufficient depth to allow a curved segment 9 of the same material as the bars 6 to extend beneath the projecting portions 8. Set screws 10 secure the segments 9 to the bars to form a rigid self-bracing structure on each field magnet core.

The segments 9 extend equal distances beyond the edges of the end plates 4, and adjacent segments are connected, in a well known manner, by the use of joint members 12 that are secured to oppositely disposed cut away portions 11 by bolts 13 and nuts 14. It is to be understood that any other suitable connecting means may be used in forming a closed circuit between adjacent segments.

The amortisseur winding is thus formed of a number of groups of embedded conductors which are so arranged with respect to each other that centrifugal stresses set up in the segments 9 do not produce excessive bending moments upon the projecting portions 8 of the conducting bars 6. Thus, a complete winding, constructed according to my invention, is rendered incapable of any distortion tending to destroy its effectiveness as an electrical device.

While I have shown my invention in its simplest and preferred form, it is not so limited, but is capable of various modifications within the scope of the appended claims.

I claim as my invention:

1. An amortisseur winding for dynamo-electric machines comprising a plurality of groups of electric conductors, each of said groups consisting of a plurality of parallel conductors embedded in the core of a field magnet, and a pair of similarly embedded conductors extending at right angles to, and located directly beneath the ends of, said parallel conductors and connected thereto, and means for connecting said groups of embedded conductors to form a closed electric circuit.

2. In the field magnet structure of a dynamo-electric machine, the combination with a magnet core provided with a plurality of parallel slots and other slots at right angles to said parallel slots, of a plurality of electric conductors carried in said slots, certain of said conductors having portions thereof superimposed upon the others, and means for connecting said conductors to form a closed electric circuit.

3. In the field magnet structure of a dynamo-electric machine, the combination with a plurality of magnet cores, each of said cores being provided with a pair of slots adjacent to the ends of said core and a plurality of parallel slots at right angles to, and opening into, said first named slots, of a plurality of electric conductors carried in said parallel slots and projecting into said first named slots, a plurality of similar conductors carried in said first named slots beneath the projecting portions of said parallel conductors, and means for connecting said slot-contained conductors to form a closed electric circuit.

4. In the field magnet structure of a dynamo-electric machine, the combination with a plurality of magnet cores, each of said cores being provided with a pair of open slots adjacent to the ends of said core and a plurality of partially closed parallel slots at right angles to, and terminating in, said open slots, of a plurality of electric conductors carried in said parallel slots and projecting into said open slots, a plurality of similar conductors carried at the bottoms of said open slots directly beneath the projecting portions of said parallel conductors, and means for connecting said slot-contained conductors to form a closed electric circuit.

In testimony whereof, I have hereunto subscribed my name this 29th day of Oct., 1914.

GEO. H. MURRAY, Jr.

Witnesses:
EMIL MOTTMAN,
B. B. HINES.

Copies of this patent may be obtained for five cents each, by addressing the "Commissioner of Patents, Washington, D. C."